United States Patent
Hayashi et al.

[11] Patent Number: 5,971,022
[45] Date of Patent: Oct. 26, 1999

[54] SELECTOR VALVE WITH COUNTERFLOW PREVENTION MEANS

[75] Inventors: Bunya Hayashi; Makoto Ishikawa, both of Yawara-mura, Japan

[73] Assignee: SMC Corporation, Tokyo, Japan

[21] Appl. No.: 08/887,259

[22] Filed: Jul. 2, 1997

[30] Foreign Application Priority Data

Jul. 29, 1996 [JP] Japan ................................ 8-216176

[51] Int. Cl.⁶ .................................................. F15B 13/04
[52] U.S. Cl. ............................. 137/625.69; 137/625.64; 137/854
[58] Field of Search ..................... 137/625.69, 625.64, 137/854

[56] References Cited

U.S. PATENT DOCUMENTS

| | | | |
|---|---|---|---|
| 2,359,802 | 10/1944 | Stephens | 137/596.12 X |
| 2,362,945 | 11/1944 | Stephens | 137/596.12 |
| 2,651,324 | 9/1953 | Hodgson et al. | 137/625.68 X |
| 3,635,249 | 1/1972 | Kirkman | 137/625.69 X |
| 3,680,596 | 8/1972 | Pickett | 137/625.69 |
| 3,874,409 | 4/1975 | Lee, II . | |
| 4,209,033 | 6/1980 | Hirsch et al. | 137/218 |
| 5,632,303 | 5/1997 | Almasy et al. | 137/218 X |

FOREIGN PATENT DOCUMENTS 1 183 327  12/1964  Germany .
2 247 737   3/1992  United Kingdom .

*Primary Examiner*—Gerald A. Michalsky
*Attorney, Agent, or Firm*—Oblon, Spivak, McClelland, Maier & Neustadt, P.C.

[57] ABSTRACT

A valve body of a selector valve incorporates a counterflow prevention means comprising a lip-type seal member to allow the forward flow of exhaust from an output port through a valve hole to an ejection port while blocking the counterflow of exhaust flowing in the opposite direction.

1 Claim, 6 Drawing Sheets

SELECTOR VALVE WITH COUNTERFLOW PREVENTION MEANS

FIELD OF THE INVENTION

The present invention relates to a selector valve with a counterflow prevention means for preventing the counterflow of exhaust.

PRIOR ART

A selector valve 1, an approximate configuration of which is shown in FIG. 9, is a well known selector valve including a pressurized fluid supply port P, pressurized fluid output ports A and B, and pressurized fluid ejection ports EA and EB. Said selector valve 1 causes a valve body (not shown) to be moved to switch the output ports A and B between the supply port P and the ejection ports EA and EB for communication. The output ports A and B are in communication with ports 2a and 2b in a fluid pressure cylinder 2, respectively.

A plurality of selector valves 1 are installed on a manifold base 4 which has a common supply channel 5 and ejection channels 6a and 6b. In each selector valve 1, a supply port P and ejection ports EA and EB are in communication with the common supply channel 5 and ejection channels 6a and 6b.

When the plurality of selector valves 1 are installed on a manifold base 4, the switched conditions of the ports determined by the valve body are different in different selector valves. Thus, when, for example, the output port A in a certain selector valve is in communication with the ejection port EA therein to eject exhaust to an ejection channel 6a, exhaust from another selector valve flowing through the ejection channel 6a may flow in a reverse direction from the ejection port EA in the first selector valve to the output port A therein (see the dotted arrow).

The counterflow of exhaust to the selector valve 1 may cause the operating equipment to malfunction, which means that the counterflow of exhaust must be prevented.

To solve this problem, Japanese Utility Model Laid Open No. 59-108872 proposes a counterflow prevention means for preventing the counterflow of exhaust. Said means is integrally formed in a gasket provided between a selector valve and a manifold base.

Although this proposed apparatus can prevent a counterflow of exhaust from the manifold base to the selector valve using the gasket in order to prevent a malfunction of the operating equipment, it must use a special expensive gasket with a check valve integrally formed therein. In addition, a selector valve with a different piping form that does not use the above manifold base, for example, a selector valve in which the supply and the ejection channels are formed in a valve body and in which a plurality of selector valves are directly joined together, cannot use such a gasket to prevent the counterflow of exhaust.

DISCLOSURE OF THE INVENTION

It is an object of this invention to provide a selector valve with a counterflow prevention function that has a special structure to eliminate the need for an expensive gasket and that can reliably prevent the counterflow of exhaust from an ejection port to an output port regardless of the piping form of the selector valve.

To solve this problem, this invention provides a selector valve in which a counterflow prevention means is directly incorporated in a valve body for switching channels.

The counterflow prevention means can consist of an annular lip-type seal member with a flexible seal lip that bends so as to have an increasing diameter, said seal member being attached to the valve body with the lip directed toward the ejection port and the tip of the lip closely contacting the inner circumferential surface of a valve hole.

Since the selector valve of the configuration according to this invention directly incorporates the counterflow prevention means in the valve body, it can reliably prevent the counterflow of exhaust from the ejection port to the output port without the use of a special expensive gasket regardless of the piping form, that is, whether or not the selector valve is of a direct piping type or a manifold piping type.

Furthermore, by attaching a general lip-type seal member with a directional seal to the valve body, the counterflow prevention means can be attached to the selector valve.

DETAILED DESCRIPTION

Figure 1:
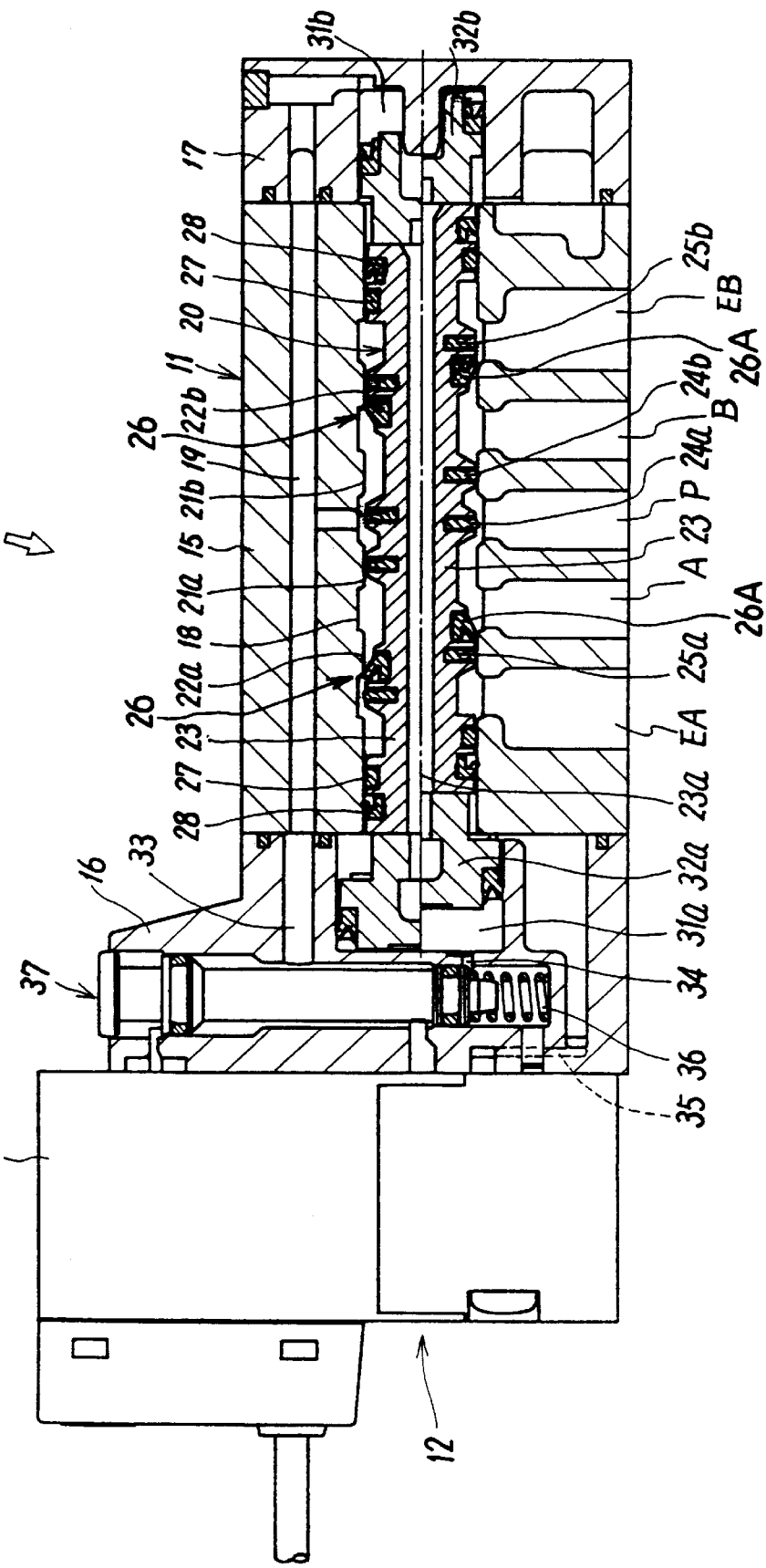
FIG. 1 is a vertical cross-sectional view of a first embodiment of a selector valve according to this invention.

FIGS. 1 to 5 shows a first embodiment of a selector valve with a counterflow prevention means according to this invention. A selector valve 10 comprises a main valve section 11 and a pilot valve section 12, and a desired number (in the illustrated example, 5) of selector valves 10 are installed on a valve installation surface 13a of a manifold base 13.

The main valve section 11 comprises a long valve body 15 with a rectangular cross section; a manual operation box 16 attached to one side of the valve body 15 in the axial direction; a pilot valve section 12 attached to the end surface of the manual operation box 16; and an end plate 17 attached to the other end of the valve body 15 in the axial direction. The valve body 15 includes a pressurized fluid supply port P opened in its mounting surface that is mounted on the manifold base 13; output ports A and B opened on either side of the supply port P; ejection ports EA and EB opened on either side of the output ports A and B; a valve hole 18 into which each of the ports is opened; and a pilot passage 19 in communication with the supply port P.

In the valve hole 18, first and second valve seats 21a and 21b are formed between the supply port P and the output ports A and B, and third and fourth valve seats 22a and 22b are formed between the output ports A and B and the ejection ports EA and EB. A spool-type valve body 20 is slidably inserted into the valve hole 18 in an air-tight manner to switch the output ports A and B between the supply port P and the ejection ports EA and EB for communication.

The valve body 20 comprises a valve rod 23 that has a throughhole 23a and a plurality of circumferential grooves formed around it, wherein first and second seal members 24a and 24b that open and close first and second valve seats 21a and 21b, third and fourth seal members 25a and 25b that open and close third and fourth valve seats 22a and 22b, seal members 28, 28 that seal both opening ends of the valve hole 18; and guides 27, 27 that guide the movement of the valve body 20 are attached to each of the circumferential grooves. The valve rod 23 also has a counterflow prevention means 26, 26 for preventing the counterflow of exhaust from the ejection ports EA and EB to the output ports A and B.

Figure 3:
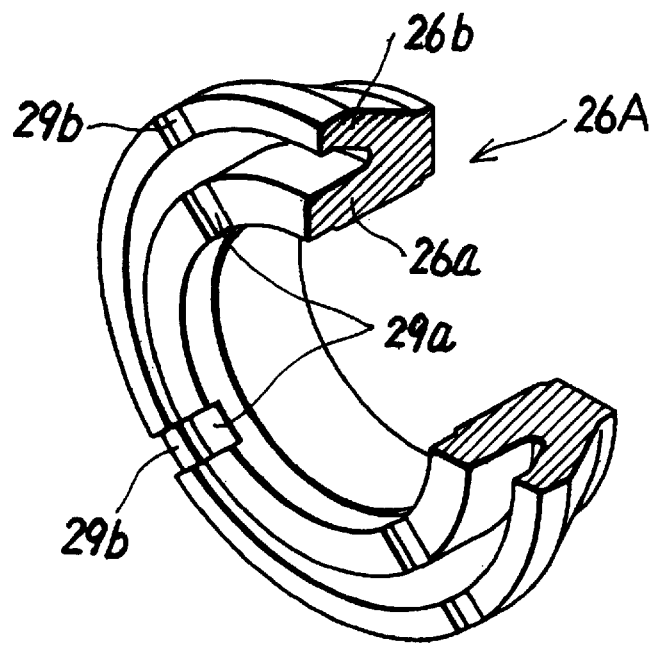
FIG. 3 is a partly broken perspective view of a seal member constituting a counterflow prevention means.
Figure 4:
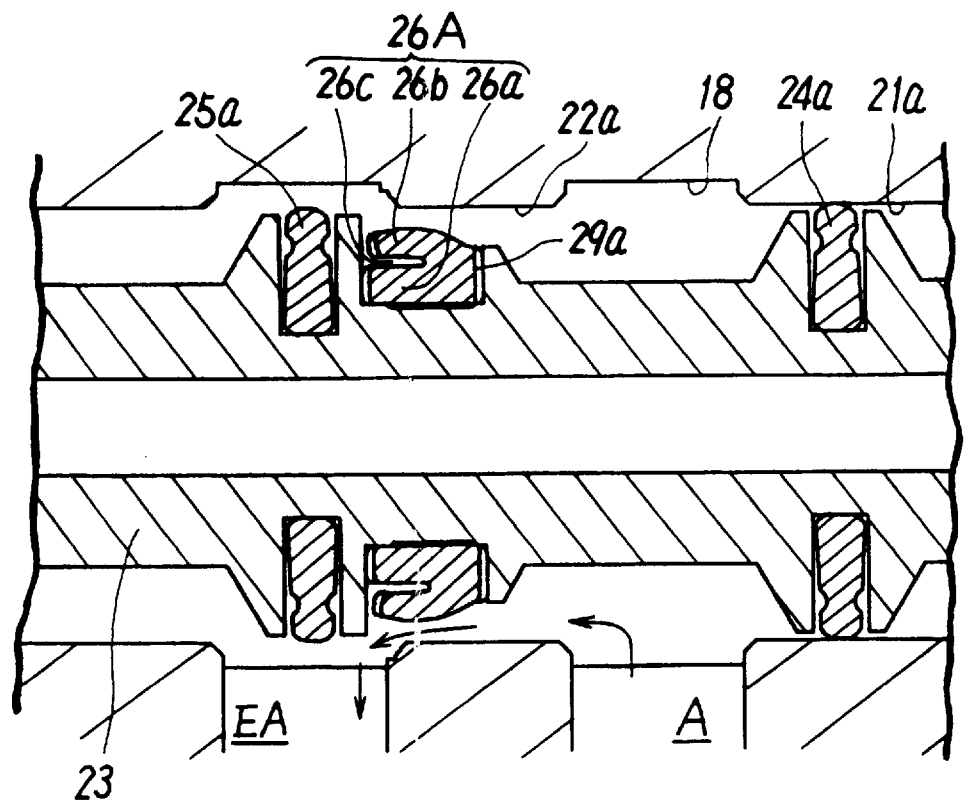
FIG. 4 is a vertical cross-sectional view of the integral part of the apparatus showing an exhaust ejection condition.

The counterflow prevention means 26 is formed with an annular lip-type seal member made of an elastic material such as synthetic rubber, as shown in detail in FIG. 3. The seal member 26A has an approximately V-shaped cross section and comprises an annular mounting section 26a that is fitted in a circumferential groove in the valve rod 23; and a flexible seal lip 26b extending from one end of the mounting section 26a toward the other end thereof while bending so as to have an increasing diameter. The seal member 26A is attached inside the third and the fourth seal members 25a and 25b in the valve body 20 with the lip 26b directed toward the ejection ports EA and EB and the tip of the lip 26b slidably contacting the inner circumferential surface of the valve hole 18.

In the counterflow prevention means 26, 26, when the valve body is in the switched state shown in the upper half of FIG. 1 with the third seal member 25a leaving the third valve seat 22a and the ejection port EA in communication with the output port A, or when the valve body is in the switched state shown in the lower half of FIG. 1 with the fourth seal member 25b leaving the fourth valve seat 22b and the ejection port EB in communication with the output port B, the tip of the lip 26b remains slidably contacting the third or the fourth valve seat 22a or 22b. When exhaust flows forward from the output port A or B to the ejection port EA or EB, the lip 26b is opened by this exhaust pressure, thereby opening the valve seat 22a or 22b. When exhaust flows backward from the ejection port EA or EB to the output port A or B, the lip 26b is pressed against the valve seat 22a or 22b by exhaust pressure, thereby closing the valve seat.

In addition, in the seal member 26A, a plurality of radial notches 29a are formed in both the inner and outer sides of the mounting section 26b, and a plurality of radial notches 29b are also formed at the tip of the lip 26b. The notches 29a in the mounting section 26a prevent air from being sealed into a circumferential groove in the valve rod 23 when the mounting section 26a is fitted in the groove in order to prevent the air from causing the seal member 26A to be raised. On the other hand, the notch 29b at the tip of the lip 26b prevents the lip 26b from adhering to the mounting section 26a to seal air into the recess 26c when the lip 26b is flexed.

A first piston chamber 31a is formed in the manual operation box 16 and a second piston chamber 31b with a smaller diameter than the first piston chamber is formed in the end plate 17. A first piston 32a and a second piston 32b are slidably inserted into the respective piston chambers in an airtight manner. The first piston chamber 31a is in communication with a pilot output passage 34 and the second piston chamber 32b is in communication with the pilot passage 19.

In addition, the pilot valve section 12 is configured as a well known, normally closed three-port solenoid valve that includes a pilot supply port, a pilot output port, and a pilot exhaust port (all not shown), wherein the pilot output port is switched between the pilot supply port and the pilot exhaust port by energizing and de-energizing the solenoid 12a.

The pilot supply port is in communication with the pilot passage 19 via the pilot supply passage 33, the pilot output port is in communication with the first pilot chamber 31a via the pilot output passage 34, and the pilot exhaust port is in communication with the exterior via the pilot exhaust passage 35.

In addition, a manual operation section 37 that is normally moved upward by the elasticity of a spring 36 to block the communication between the pilot supply channel 33 and the pilot output passage 34 and that allows the pilot passages 33 and 34 to communicate with each other when pressed is inserted into the manual operation box 16.

Thus, if service interruption prevents the main valve section 11 from being driven by the pilot valve section 12, the manual operation section 37 can be used to drive the valve body 20.

Figure 2:
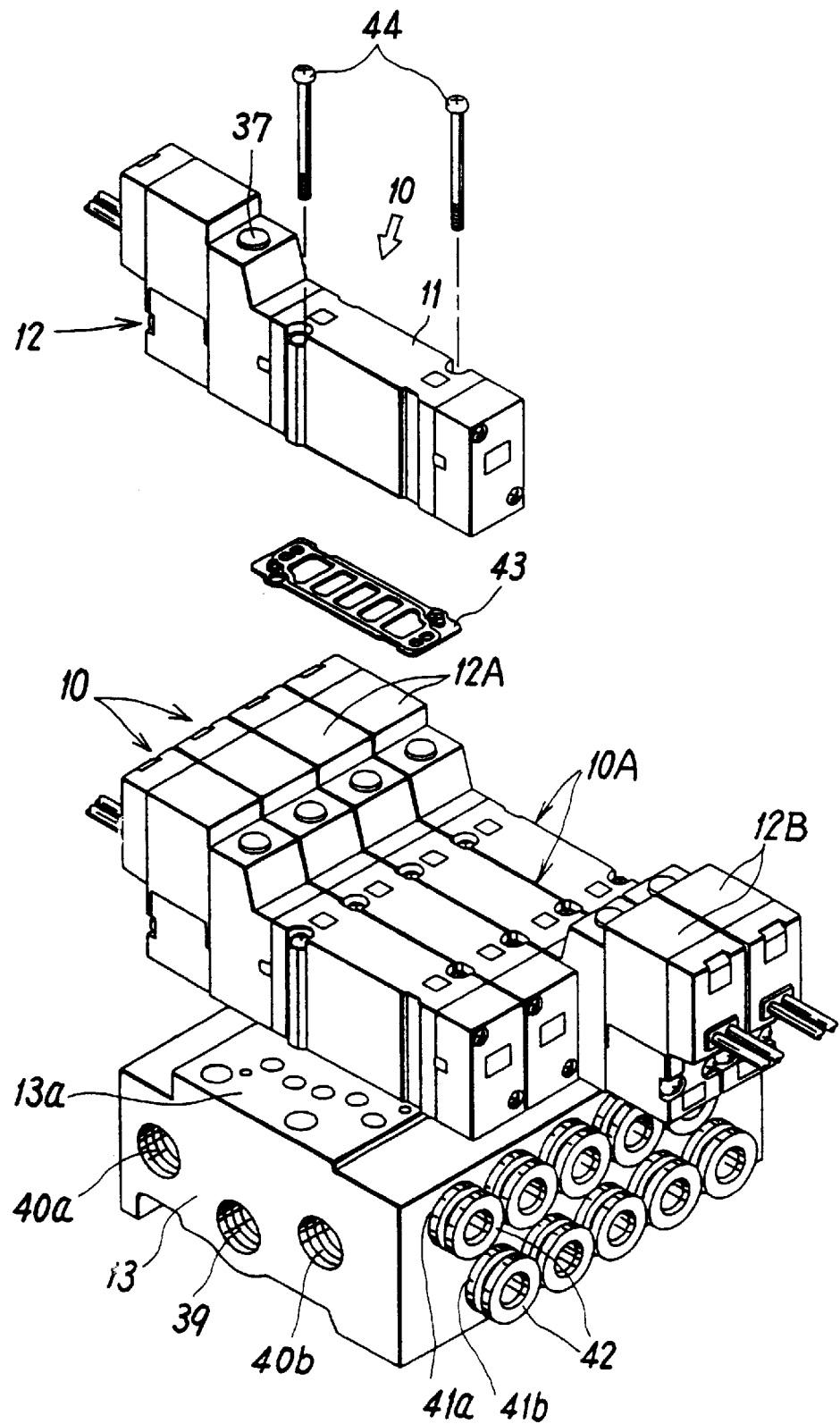
FIG. 2 is a perspective view showing the mounting of a plurality of selector valves on a manifold base.

As shown in FIG. 2, the manifold base 13 comprises a supply channel 39 and ejection channels 40a and 40b all extending in the longitudinal direction; and output openings 41a and 41b opened on one side thereof. Quick pipe joints 42 that are engaged with a tube (not shown) when said tube is inserted and that are disengaged from said tube to allow it to be removed when a release button is pressed are attached to the output openings.

In addition, the channels 39, 40a, and 40b and the output openings 41a and 41b are all opened on the valve installation surface 13a. When a gasket 43 is loaded on the valve installation surface 13a and the selector valve 10 is mounted using set screws 44, 44, each port of the selector valve 10 communicates with the corresponding opening in the manifold base 13.

Although the illustrated manifold base has a length corresponding to the number of connected selector valves, a plurality of bases each with a single selector valve installed thereon can be connected together.

In the selector valve 10, when the solenoid 12a is de-energized, the pressure of pilot fluid supplied to the second piston chamber 31b causes the second piston 32b and the valve body 20 to move toward the left in the figure, thereby causing the supply port P to communicate with the output port B and the output port A to communicate with the ejection port EA (see the upper half of the valve body 20 in FIG. 1), and outputting compressed air from the output port B.

When the solenoid 12a is energized, pilot fluid is supplied from the pilot output port to the first piston chamber 31a to cause the first piston 32a and the valve body 20 to move toward the right in the figure due to the difference in diameter between the first and the second pistons, thereby causing the supply port P to communicate with the output port A and the output port B to communicate with the ejection port EB (see the lower half of the valve body 20 in FIG. 1), and outputting compressed air from the output port A.

In addition, if the valve body 20 cannot be driven by the pilot valve section 12 and if the manual operation section 37 is pressed, the valve body 20 is moved toward the right in the figure. When the manual operation section 37 is released, the valve body 20 is moved toward the left in the figure.

Figure 5:
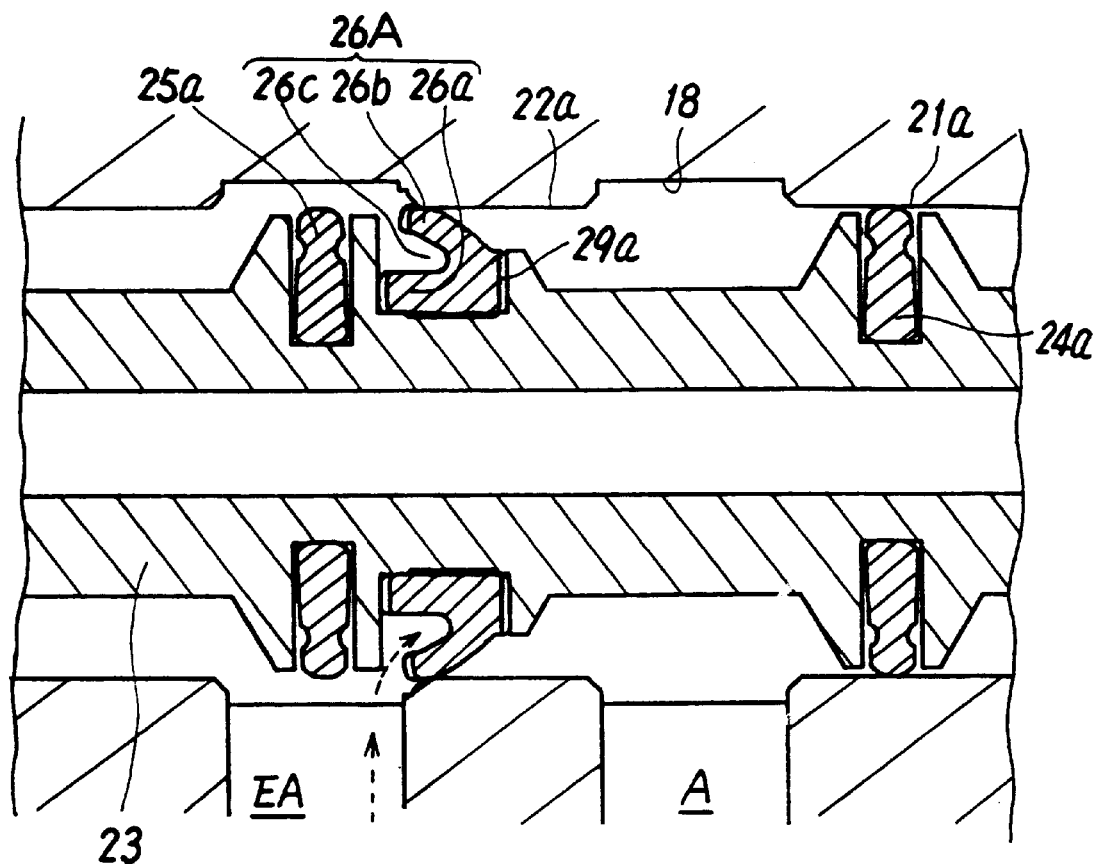
FIG. 5 is a vertical cross-sectional view of the integral part of the apparatus showing the prevention of the counterflow of exhaust.

In the selector valve 10, while exhaust is being ejected from the output port A or B toward the ejection port EA or EB, exhaust pressure causes the lip 26b of the seal member 26A to be opened, thereby opening the third or the fourth valve seat 22a or 22b, and allowing the exhaust to flow out, as typically shown by one of the counterflow prevention means 26. On the other hand, exhaust flowing through the ejection channel 40a or 40b in the manifold base 13 flows in a reverse direction though the discharge port EA or EB in the selector valve 10, this counterflow exhaust pressure causes the lip 26b of the seal member 26A to be pressed against the third or fourth valve seat 22a or 22b, thereby blocking communication between the ejection port EA or EB and the output port A or B, as shown in FIG. 5. Consequently, the counterflow of exhaust through the selector valve 10 can be prevented to eliminate any malfunction of the operating equipment caused by the counterflow of exhaust.

Figure 6:
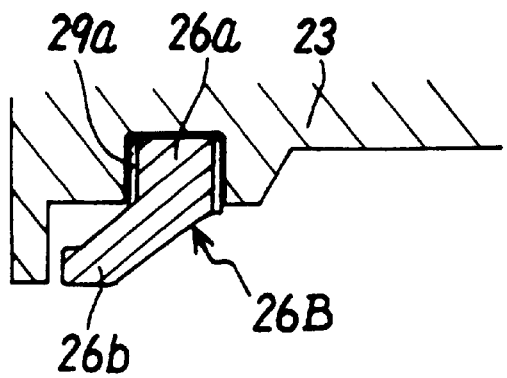
FIG. 6 is a cross-sectional view of a variation of the counterflow prevention means.

FIG. 6 shows a variation of a lip-type seal member constituting the counterflow prevention means. Compared to the seal member 26A with a V-shaped cross section formed by increasing the width of the mounting section 26a, a seal member 26B has a simple cross section in which the width of the mounting section 26a is reduced and in which the lip 26b diagonally extends outward from the mounting section 26a. In this seal member 26B, a notch 29a is also formed in the mounting section 26a to prevent the seal member 26B from being raised.

Counterflow prevention by the seal member 26B is almost the same as that by the seal member 26A, so its description is omitted.

Figure 7:
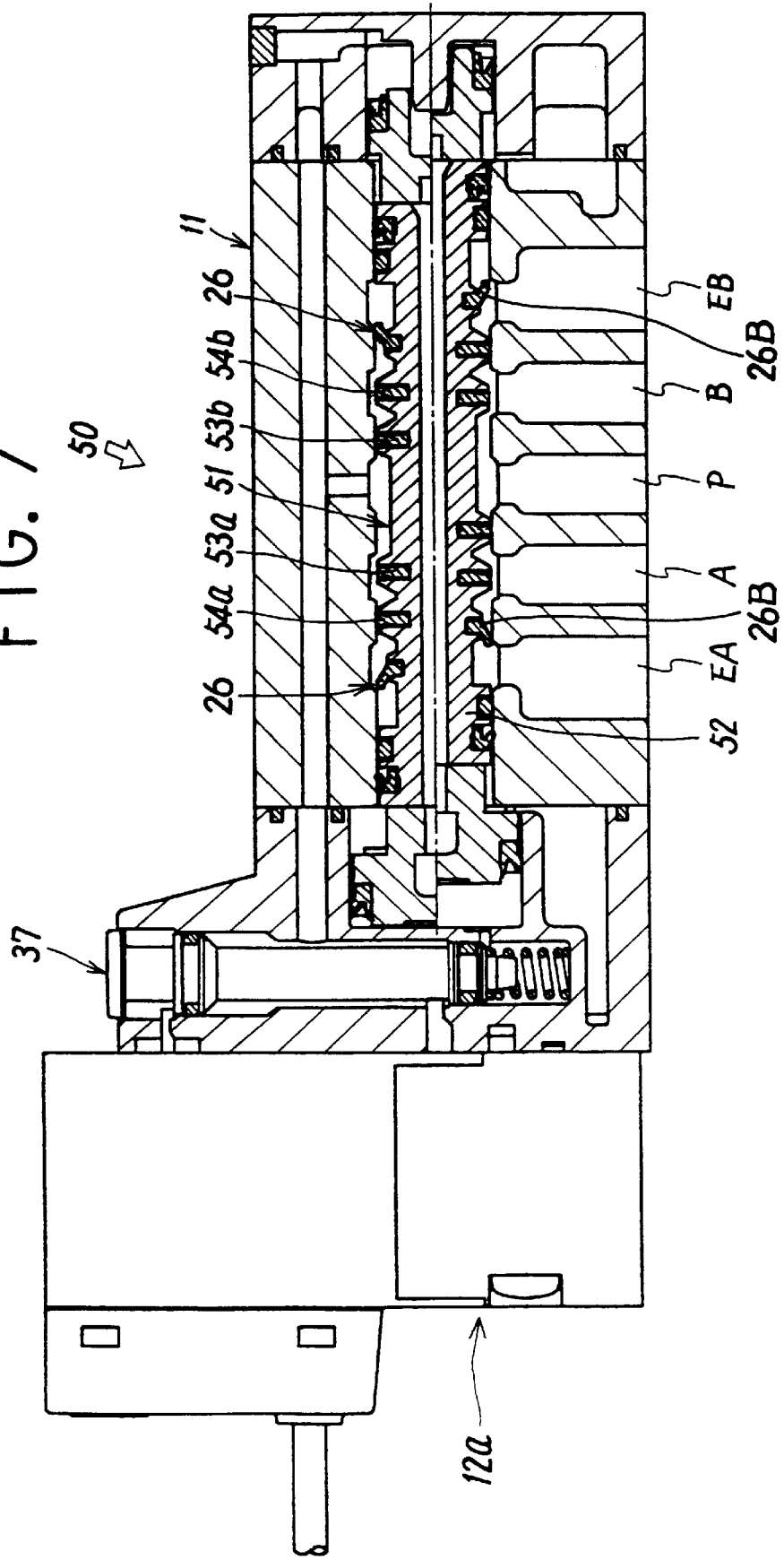
FIG. 7 is a vertical cross-sectional frontal view of a second embodiment of the selector valve.
Figure 8:
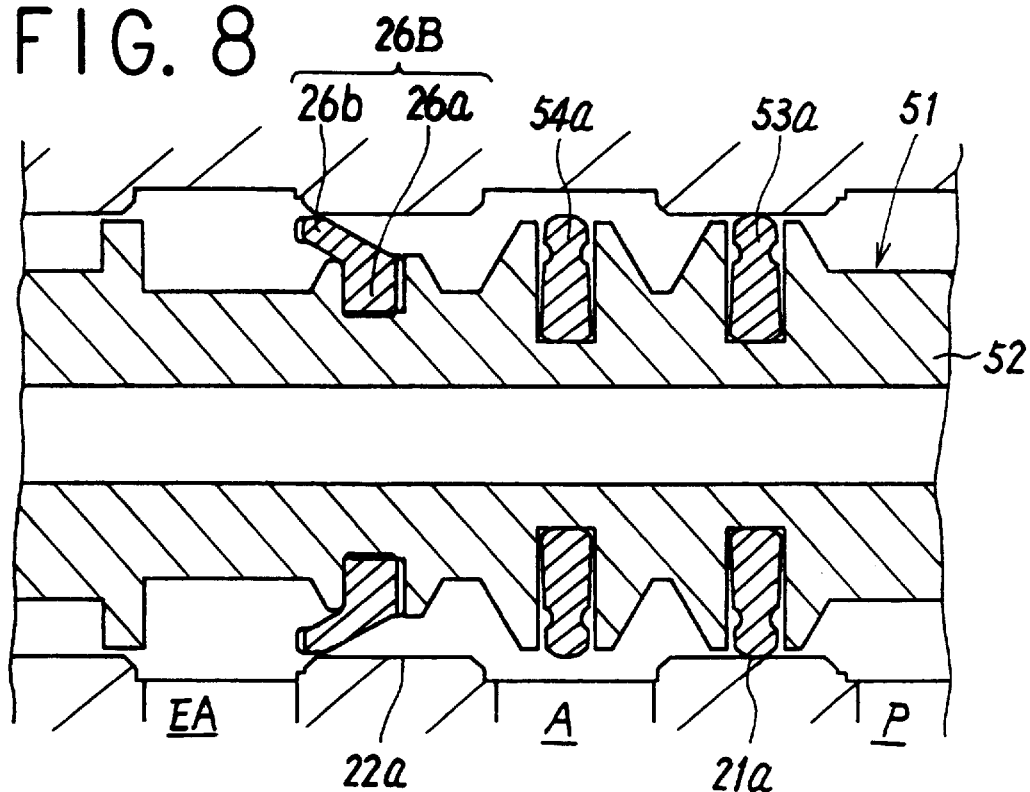
FIG. 8 is a vertical cross-sectional view of the integral part of the selector valve in FIG. 7.
Figure 9:
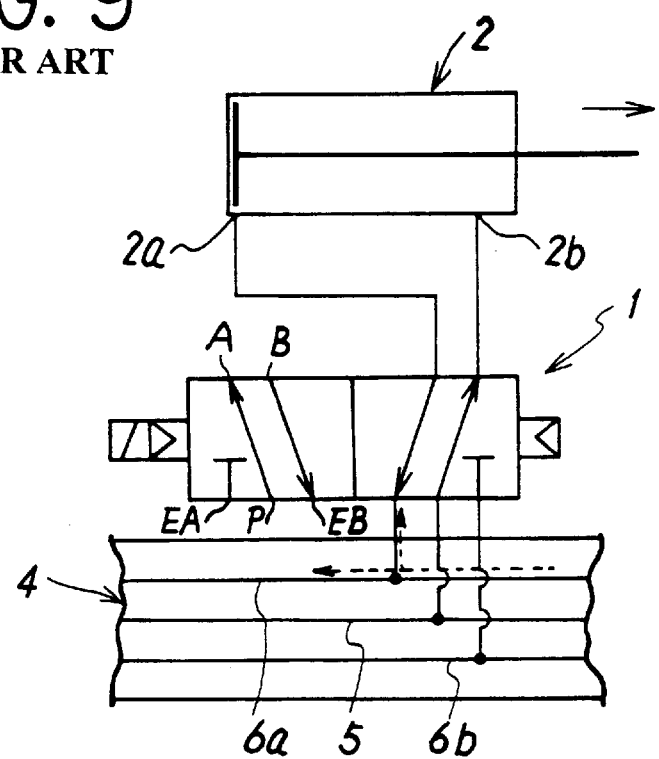
FIG. 9 shows the configuration of a publicly known selector valve.

FIGS. 7 and 8 show a second embodiment of this invention, and a selector valve 50 according to the second embodiment differs from the valve body 20 according to the first embodiment in the mounting positions of the first and second seal members 53a and 53b, the third and fourth seal members 54a and 54b, and the counterflow prevention means 26, 26 in a valve body 51.

The other configuration and exhaust counterflow prevention by the counterflow prevention means 26, 26, however, are almost the same as those in the selector valve 10 according to the first embodiment. Thus, the same main components have the same reference numbers and their detailed description is omitted.

Although the counterflow prevention means 26 according to the second embodiment uses the seal member 26B of the structure shown in FIG. 6, the seal member 26A of the structure shown in FIG. 3 may be reasonably used instead.

In addition, the selector valve according to this invention is not limited to the single pilot selector valve 10 shown in FIG. 1, but may be a double pilot selector valve 10A with two pilot valve sections 12A and 12B as shown in FIG. 2. Alternatively, it is not limited to a selector valve with a fluid-pressure-driven pilot valve section, but may be a directly driven type that uses solenoids to directly drive the valve body.

Furthermore, although the valve body of the selector valve is a spool-type valve, it may also be a poppet-type valve. In addition, the selector valve may be a direct-piping-type valve that does not use manifold bases.

What is claimed is:

1. A selector valve comprising a pressurized fluid supply port, a pressurized fluid output port, and a pressurized fluid ejection port, a valve hole into which the ports are opened, and a valve body movably inserted into the valve hole and moved to selectively connect said output port with one of the supply port and the ejection port, wherein:

said valve body incorporates a counterflow prevention means for allowing the forward flow of exhaust from the output port through the valve hole to the ejection port while blocking the counterflow of exhaust; said counterflow prevention means also preventing the counterflow of exhaust from the ejection port to the output port when flow channels therebetween are opened;

said counterflow prevention means comprising an annular lip-type seal member with a flexible lip that bends so as to have an increasing diameter, wherein the seal member is attached to the valve body with said lip directed toward the ejection port and the tip of the lip closely contacts the inner circumferential surface of the valve hole.

* * * * *